United States Patent
Yoo et al.

(10) Patent No.: US 9,503,285 B2
(45) Date of Patent: Nov. 22, 2016

(54) CHANNEL ESTIMATION FOR REFERENCE SIGNAL INTERFERENCE CANCELATION

(75) Inventors: Taesang Yoo, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1037 days.

(21) Appl. No.: 13/195,711

(22) Filed: Aug. 1, 2011

(65) Prior Publication Data

US 2012/0224499 A1  Sep. 6, 2012

Related U.S. Application Data

(60) Provisional application No. 61/448,100, filed on Mar. 1, 2011.

(51) Int. Cl.
  *H04W 52/02* (2009.01)
  *H04L 25/02* (2006.01)
  *H04J 11/00* (2006.01)

(52) U.S. Cl.
  CPC .......... *H04L 25/0204* (2013.01); *H04J 11/005* (2013.01); *H04L 25/0224* (2013.01); *H04W 52/02* (2013.01)

(58) Field of Classification Search
  CPC .......... H04J 11/00; H04L 25/02; H04L 5/00; H04W 52/02
  See application file for complete search history.

(56) References Cited

U.S. PATENT DOCUMENTS

| 7,760,698 B2 * | 7/2010 | Chen et al. .................. 370/342 |
| 2010/0008282 A1 | 1/2010 | Bhattad et al. |
| 2010/0105317 A1 | 4/2010 | Palanki et al. |
| 2010/0285734 A1 | 11/2010 | Black et al. |

(Continued)

FOREIGN PATENT DOCUMENTS

| GB | 2456874 A | 8/2009 |
| JP | 2798128 B2 | 9/1998 |

(Continued)

OTHER PUBLICATIONS

R1-105997, "UTDOA Performance with SRS Interference Cancellation", Alcatel-Lucent, Alcatel-Lucent Shanghai Bell; Jacksonville, FL, U.S.A., Nov. 15-19, 2010.

(Continued)

*Primary Examiner* — Xavier Wong
(74) *Attorney, Agent, or Firm* — Norton Rose Fulbright US LLP

(57) ABSTRACT

Various aspects disclosed are directed to improvements to channel estimation through more efficient cancelation of neighboring common reference signals (CRS). Cancelation of CRS from other cells allows the user equipment (UE) a better opportunity for accurately detecting the reference signal of the current cell. Alternative aspects have a recursive element that uses previous estimates as the basis for the current channel estimate. The various aspects of the present disclosure generally have two alternative embodiments: (1) initializing the channel estimation for all cells with a previous channel estimate and cancellation of reference signals of non-target cells to accurately update channel estimate of the target cell; and (2) initializing the channel estimate for all cells with a previous channel estimate and cancelation of reference signals of all cells to accurately estimate residual channel estimate of the target cell and update its channel estimate.

36 Claims, 9 Drawing Sheets

(56) References Cited

U.S. PATENT DOCUMENTS

| | | |
|---|---|---|
| 2011/0032838 A1 | 2/2011 | Liu et al. |
| 2011/0038407 A1 | 2/2011 | Ki et al. |
| 2011/0176466 A1* | 7/2011 | Lindoff ............. H04W 52/0238 370/311 |
| 2012/0300884 A1* | 11/2012 | You .................... H04L 25/0204 375/340 |

FOREIGN PATENT DOCUMENTS

| | | |
|---|---|---|
| JP | 2010268220 A | 11/2010 |
| WO | WO-2010005640 A2 | 1/2010 |
| WO | WO-2010014968 A1 | 2/2010 |
| WO | WO2010141912 A2 | 12/2010 |

OTHER PUBLICATIONS

International Search Report and Written Opinion—PCT/US2012/026952—ISA/EPO—May 22, 2012.
Alcatel-Lucent, et al., 3GPP, "UTDOA Performance with SRS Interference Cancellation," 3GPP TSG RAN WG1 #63, R1-105997, Jacksonville, FL, USA, Nov. 15-19, 2010, pp. 1-6.

* cited by examiner

CHANNEL ESTIMATION FOR REFERENCE SIGNAL INTERFERENCE CANCELATION

CROSS-REFERENCE TO RELATED APPLICATIONS

This application claims the benefit of U.S. Provisional Patent Application No. 61/448,100, entitled, "CHANNEL ESTIMATION FOR REFERENCE SIGNAL INTERFERENCE CANCELATION", filed on Mar. 1, 2011, which is expressly incorporated by reference herein in its entirety.

BACKGROUND

Field

Aspects of the present disclosure relate generally to wireless communication systems, and more particularly, to channel estimation for reference signal (RS) interference cancellation.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Various aspects of the present disclosure are directed to improvements to channel estimation through more efficient cancelation of neighboring common reference signals (CRS). Cancelation of CRS from other cells allows the user equipment (UE) a better opportunity for accurately detecting the reference signal of the current cell. Alternative aspects have a recursive element that uses previous estimates as the basis for the current channel estimate. The various aspects of the present disclosure generally have two alternative embodiments: (1) initializing the channel estimation for all cells with a previous channel estimate and cancellation of reference signals of non-target cells to accurately update channel estimate of the target cell; and (2) initializing the channel estimate for all cells with a previous channel estimate and cancelation of reference signals of all cells to accurately estimate residual channel estimate of the target cell and update its channel estimate.

In the first general alternative of the various aspects, a UE begins by initializing a channel estimate for all cells with a previous channel estimate computed for a previous subframe. At each stage, the UE selects a target cell from the all cells. The reference signals of non-target cells, reconstructed based on their respective channel estimates, are canceled from a received signal and then the remaining signal is filtered with a single cell channel estimator. The channel estimate of the target cell is then updated using the filtered remaining signals. The UE then moves on to the next stage, where a different target cell is selected and the cancelation of non-target cells, filtering, and updating is performed to obtain updated channel estimate for the new target cell. The UE repeats the procedure until all the stages are finished, by which time all the cells will have been selected as target cells at least once. Over the course of the procedure, a given cell may be selected multiple times as a target cell, so that the cancelation, filtering, and updating for the cell may occur iteratively over multiple times to increase the accuracy of the channel estimate of the given cell. The channel estimate from the previous subframe that is used may either be the actual previous estimate or based on the previous estimate depending on the correlation between the two subframes.

In the second general alternative of the various aspects, the same process is performed except that, the reference signals of both the target and non-target cells are canceled from the received signals. Thus, the UE begins by initializing a channel estimate for all cells with a previous channel estimate computed for a previous subframe. At each stage, the UE selects a target cell from all the cells. CRS of both the target and non-target cells, reconstructed based on their respective channel estimates, are canceled from a received signal and then the remaining signal is filtered with a single cell channel estimator. Because the CRS of the target cell, reconstructed from the target cell's previous channel estimate, was also cancelled from the received signal, the filtered remaining signal represents the portion of the target cell's channel estimate that was previously not captured. Thus, the channel estimate of the target cell is then updated by adding the filtered remaining signals to the target cell's previous channel estimate. The UE then moves on to the next stage, where a different target cell is selected and the cancelation of target and non-target cells, filtering, and updating is performed to obtain updated channel estimate for the new target cell. The UE repeats the procedure until all the stages are finished, by which time all the cells will have been selected as target cells at least once. Over the course of the procedure, a given cell may be selected multiple times as a target cell, so that the cancelation, filtering, and updating for the cell may occur iteratively over multiple times to increase the accuracy of the channel estimate of the given cell. As with the first alternative, the channel estimate from the previous subframe that is used may either be the actual previous estimate or based on the previous estimate depending on the correlation between the two subframes.

In one aspect of the disclosure, a method of wireless communication includes initializing a current channel estimate using a previous channel estimate computed for a previous subframe, selecting a target cell from multiple cells, canceling interfering signals of non-target cells from a received signal in the target cell, filtering the remaining signal using a channel estimator, and updating the current channel estimate of the target cell using the filtered remaining signal.

In one aspect of the disclosure, a method of wireless communication includes initializing a current channel estimate using a previous channel estimate computed for a previous subframe, canceling interfering signals of a target cell and non-target cells from a received signal, filtering the residual signal using a channel estimator, and updating the current channel estimate of the target cell using the filtered residual signal and the previous channel estimate.

In an additional aspect of the disclosure, a UE configured for wireless communication includes means for initializing a current channel estimate using a previous channel estimate computed for a previous subframe, means for selecting a target cell from multiple cells, means for canceling interfering signals of non-target cells from a received signal in the target cell, means for filtering the remaining signal using a channel estimator, and means for updating the current channel estimate of the target cell using the filtered remaining signal.

In an additional aspect of the disclosure, a UE configured for wireless communication includes means for initializing a current channel estimate using a previous channel estimate computed for a previous subframe, means for canceling interfering signals of a target cell and non-target cells from a received signal, means for filtering the residual signal using a channel estimator, and means for updating the current channel estimate of the target cell using the filtered residual signal and the previous channel estimate.

In an additional aspect of the disclosure, a computer program product has a computer-readable medium having program code recorded thereon. This program code includes code to initialize a current channel estimate using a previous channel estimate computed for a previous subframe, code to select a target cell from multiple cells, code to cancel interfering signals of non-target cells from a received signal in the target cell, code to filter the remaining signal using a channel estimator, and code to update the current channel estimate of the target cell using the filtered remaining signal.

In an additional aspect of the disclosure, a computer program product has a computer-readable medium having program code recorded thereon. This program code includes code to initialize a current channel estimate using a previous channel estimate computed for a previous subframe, code to cancel interfering signals of a target cell and non-target cells from a received signal, code to filter the residual signal using a channel estimator, and code to update the current channel estimate of the target cell using the filtered residual signal and the previous channel estimate.

In an additional aspect of the disclosure, an apparatus includes at least one processor and a memory coupled to the processor. The processor is configured to initialize a current channel estimate using a previous channel estimate computed for a previous subframe, select a target cell from multiple cells, cancel interfering signals of non-target cells of the plurality of cells from a received signal in the target cell, filter the remaining signal using a channel estimator, and update the current channel estimate of the target cell using the filtered remaining signal.

In an additional aspect of the disclosure, an apparatus includes at least one processor and a memory coupled to the processor. The processor is configured to initialize a current channel estimate using a previous channel estimate computed for a previous subframe, cancel interfering signals of a target cell and non-target cells from a received signal, filter the residual signal using a channel estimator, and update the current channel estimate of the target cell using the filtered residual signal and the previous channel estimate.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
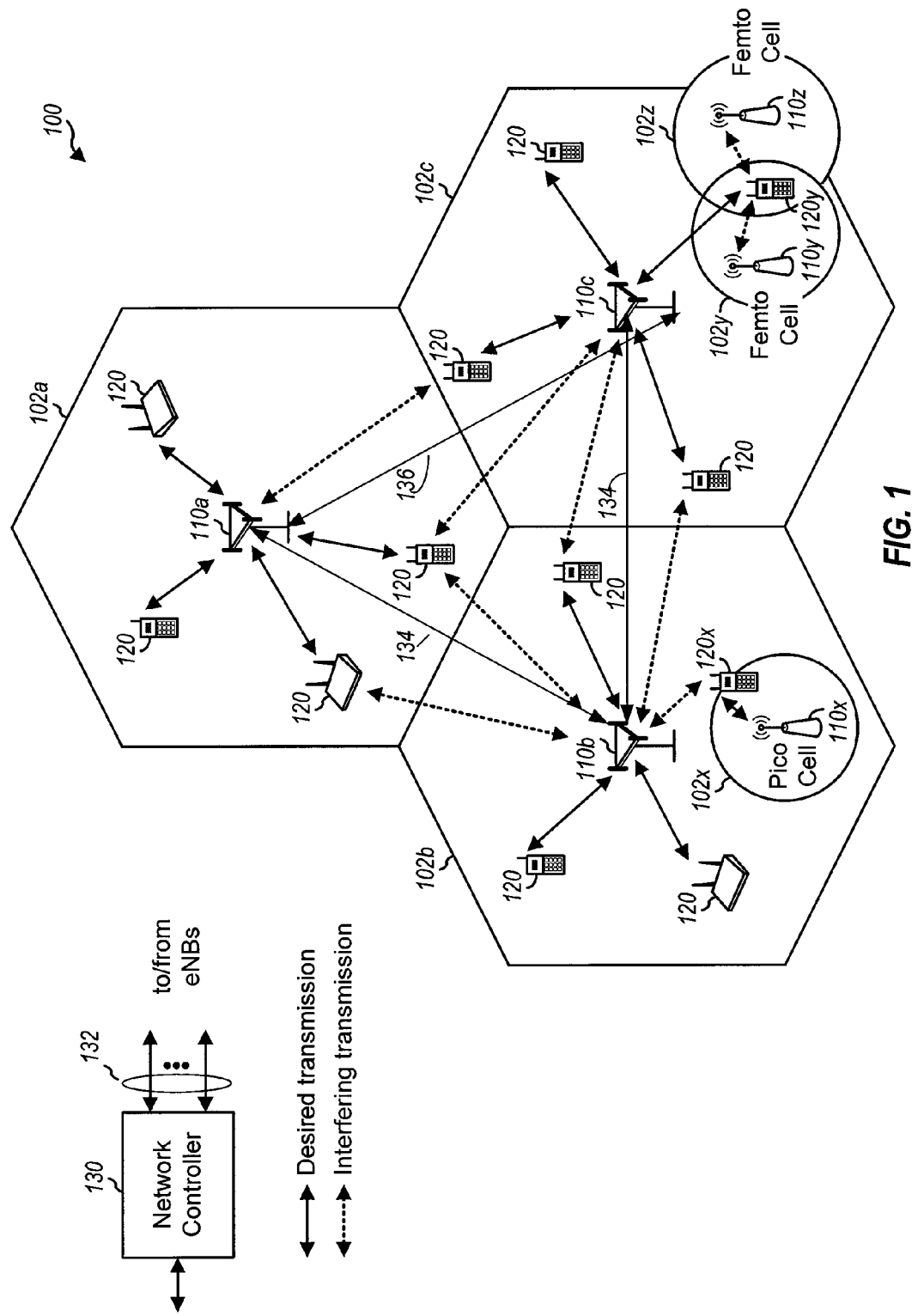
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for global or local synchronous operations in multicell scenarios or asynchronous operations in single cell scenarios.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

Figure 2:
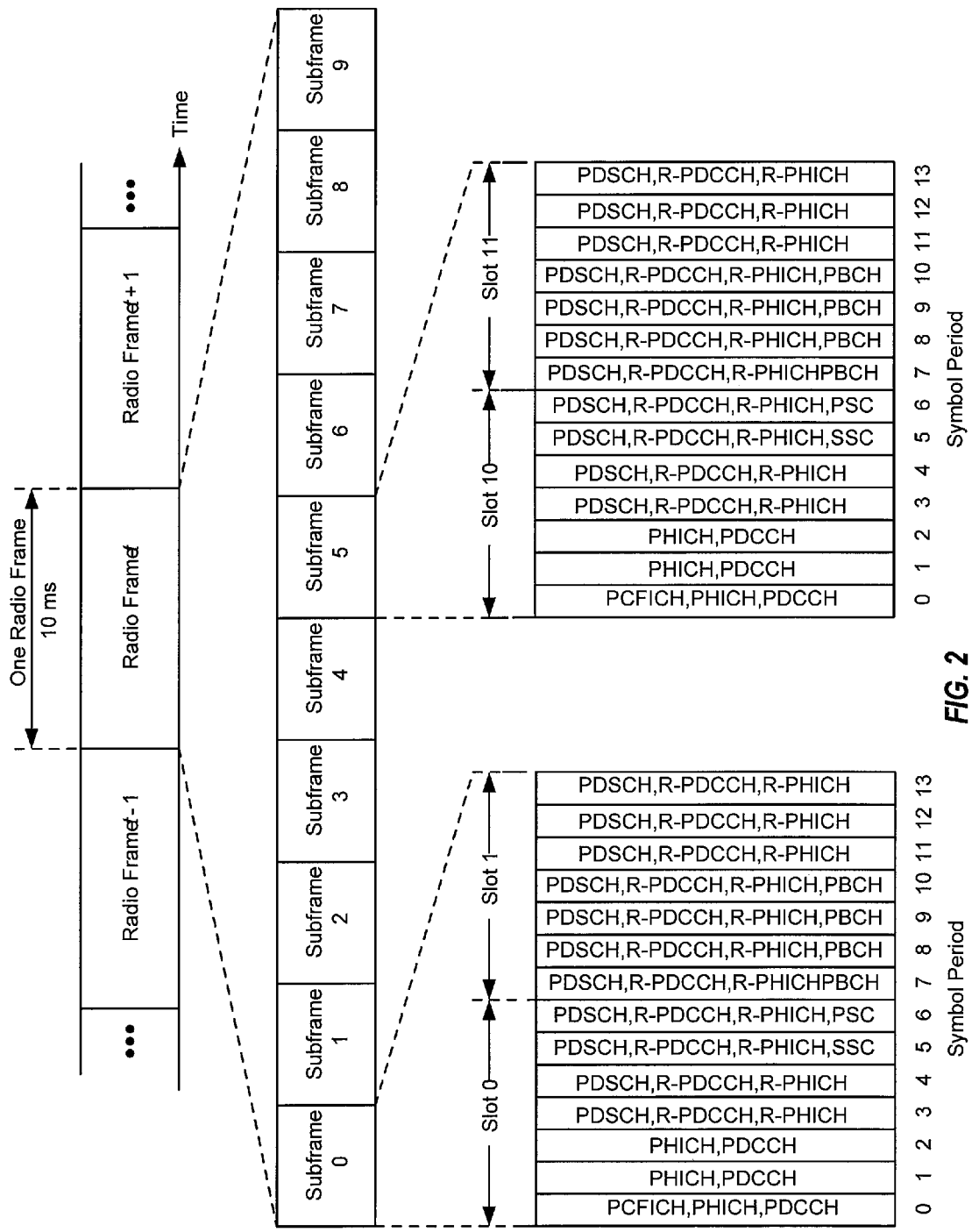
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
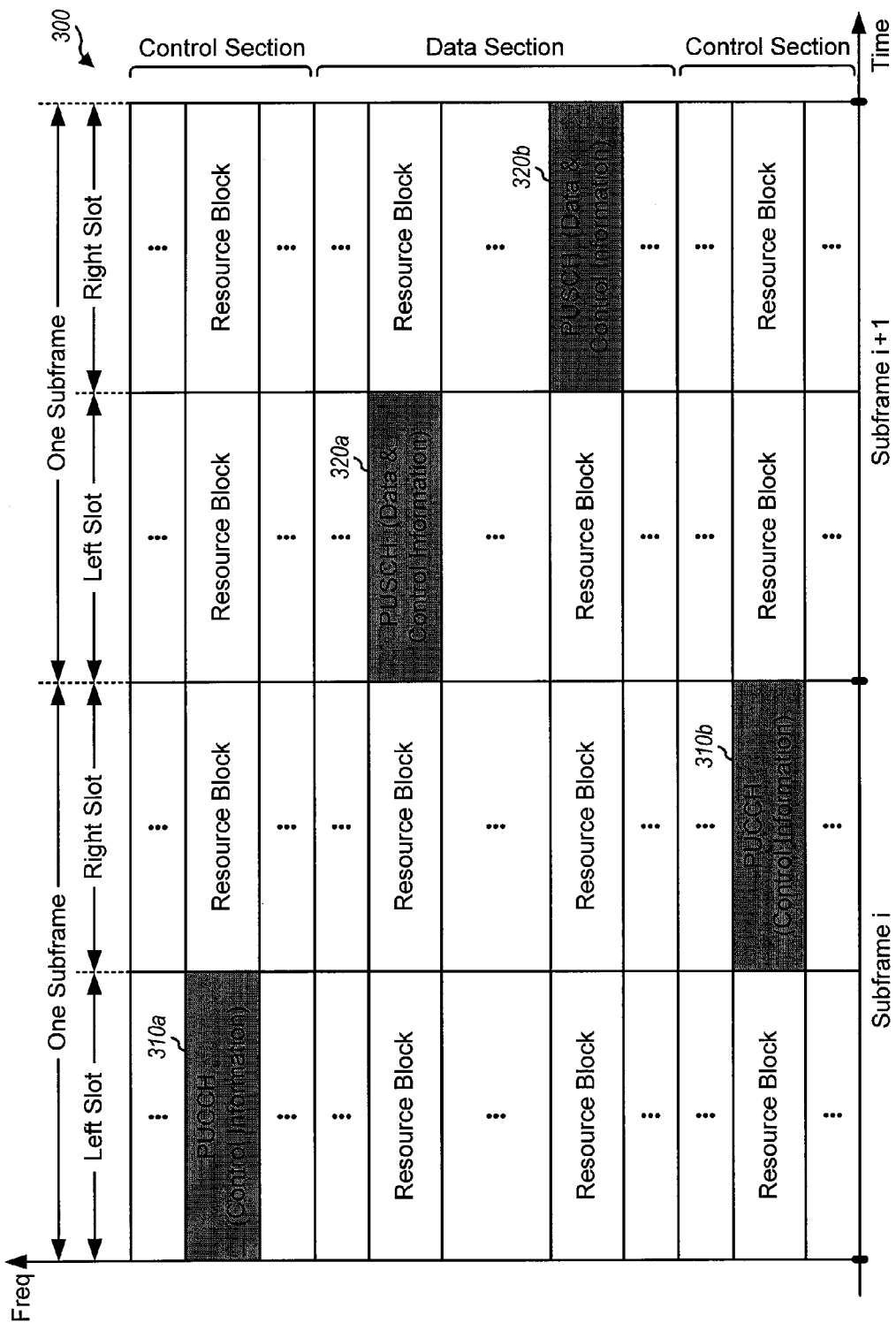
FIG. 3 is a block diagram conceptually illustrating an exemplary frame structure in uplink LTE/-A communications.

FIG. 3 is a block diagram conceptually illustrating an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310a and 310b in the control section. The UE may transmit only data or both data and control information in a Physical Uplink Shared Channel (PUSCH) on the assigned resource blocks 320a and 320b in the data section. An uplink transmission may span both slots of a subframe and may hop across frequency as shown in FIG. 3.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

In a heterogeneous network with range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from other eNBs. Prohibited subframes are subframes assigned to a another eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 4:
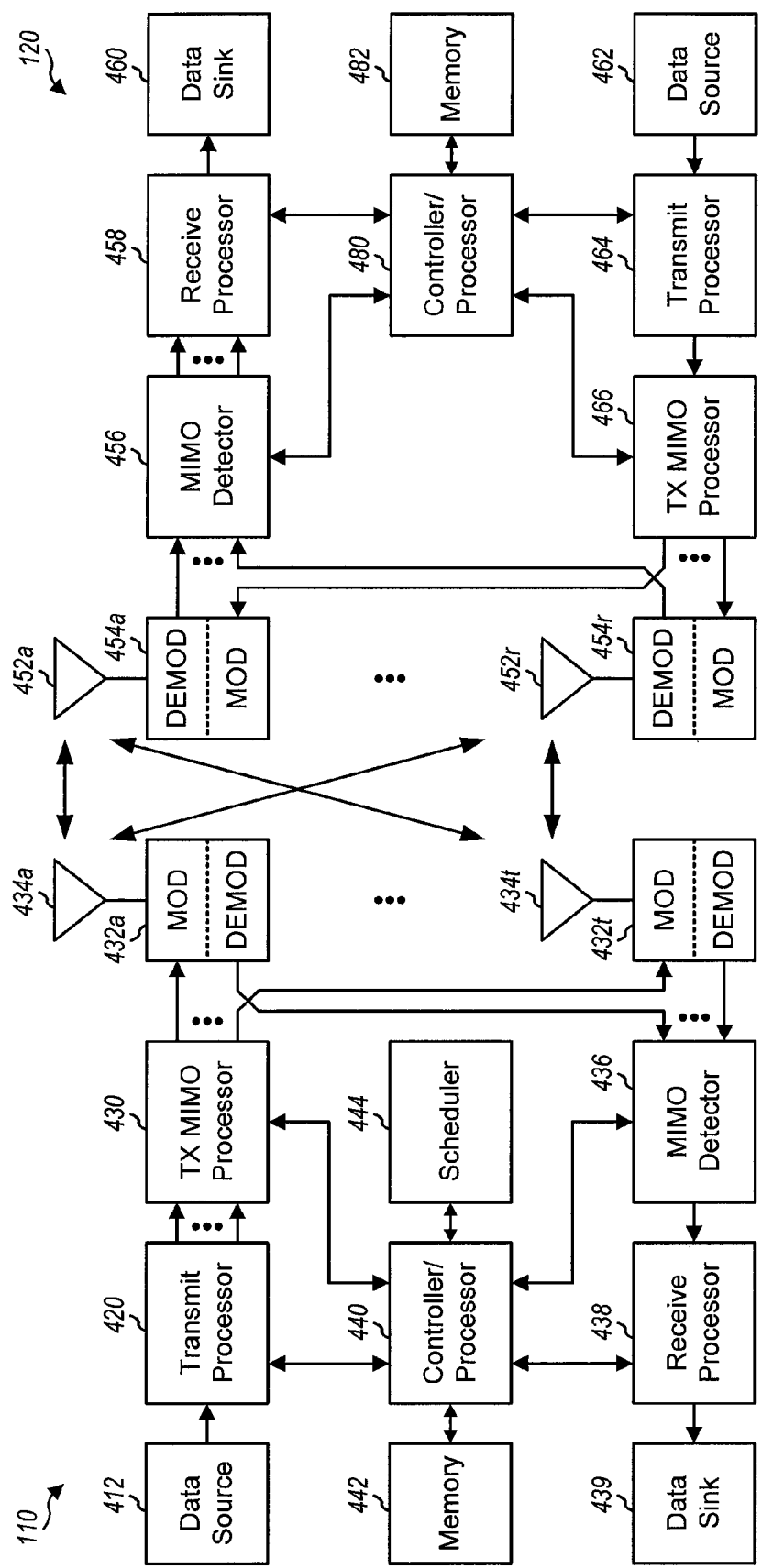
FIG. 4 is a block diagram conceptually illustrating a design of a base station/eNB and a UE configured according to one aspect of the present disclosure.

FIG. 4 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 434a through 434t, and the UE 120 may be equipped with antennas 452a through 452r.

At the eNB 110, a transmit processor 420 may receive data from a data source 412 and control information from a controller/processor 440. The transmit processor 420 may process (e.g., encode and symbol map) the data and control information to obtain data symbols and control symbols, respectively. The transmit processor 420 may also generate reference symbols. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the eNB 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information from the controller/processor 480. The transmit processor 464 may also generate reference symbols for a reference signal. The symbols from the transmit processor 464 may be precoded by a TX MIMO processor 466 if applicable, further processed by the demodulators 454a through 454r, and transmitted to the eNB 110. At the eNB 110, the uplink signals from the UE 120 may be received by the antennas 434, processed by the modulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440.

The controllers/processors 440 and 480 may direct the operation at the eNB 110 and the UE 120, respectively. The controller/processor 440 and/or other processors and modules at the eNB 110 may perform or direct the execution of various processes for the techniques described herein. The controller/processor 480 and/or other processors and modules at the UE 120 may also perform or direct the execution of the functional blocks illustrated in FIGS. 5, 6, 7, and 8 and/or other processes for the techniques described herein. The memories 442 and 482 may store data and program codes for the eNB 110 and the UE 120, respectively. A scheduler 444 may schedule UEs for data transmission on the downlink and/or uplink.

In addition to the ICIC effected through coordination of various eNBs in LTE/-A networks, additional interference cancelation may be provided directly by some UEs. The detection and processing power in many advanced UEs allow for the detection and cancelation of interfering signals. One form of this interference cancelation is common reference signal (CRS) interference cancelation. Cancelation of CRS from other cells allows the UE a better opportunity for accurately detecting the reference signal of the current cell.

One process used during interference cancelation is channel estimation. Typically, for a single cell channel estimator, channel estimation relies on reference signal observations over a given time interval or subframe. In the simplest case, channel estimate $\hat{h}[n]$ of $h[n]$ for subframe n is derived based on CRS tones on the same subframe. In general, the reference signal observations, such as the received signals on CRS tone positions, can be expressed as:

$$y[n] = B[n]h[n] + n[n] \quad (1)$$

where n is the time or subframe index, y[n], h[n], and n[n] are, respectively, the vectors of received signals, channel gains, and additive noise on the given reference signal tone positions, and B[n] is a diagonal matrix whose diagonal elements represent the known reference signal sequence, such as the CRS scrambling sequence. The vectors represent a certain reference signal point within the particular subframe, n. The receiver or UE knows B[n] and physically observes y[n]. Thus, the interference cancelation process estimates the channel gains, h[n], for the channel estimate, $\hat{h}[n]$. Then, assuming the use of a linear channel estimator, the channel estimate $\hat{h}[n]$ may be generally written as a function of y[n] as $\hat{h}[n]=W[n]y[n]$, where W[n] is a matrix that represents the end-to-end channel estimation operation. For a non-linear channel estimator, a more general form may be written as $\hat{h}[n]=f_n(y[n])$, with $f_n$ denoting the channel estimation operation. For simplicity descriptions of linear channel estimators are provided. However, the disclosed principles may be used with any type of channel estimator, linear or non-linear. In general, W[n] is given as a function of B[n] and the statistics associated with h[n] and n[n]. The statistics may be assumed a priori or may be learned.

The matrix representation of the channel estimator, W[n], abstractly represents the filtering performed on the channel gain, h[n]. In implementation, this filtering may be employed using matrix multiplication or processes that may be represented using matrix multiplication, such as inverse fast Fourier transformation (IFFT), combinational FFT, windowing, and the like.

In order to improve channel estimation accuracy, various implementations may use RS from adjacent subframes. For example, the observed RS on subframes n−1, n, and n+1 may each be used to estimate h[n]. That is, $$\hat{h}[n] = \tilde{W}[n] \begin{bmatrix} y[n-1] \\ y[n] \\ y[n+1] \end{bmatrix} \quad (2)$$

for certain $\tilde{W}[n]$.

In other implementations, filtering may be performed over time, such as over multiple subframes. For example, $\hat{h}[n] = \alpha\hat{h}[n-1]+(1-\alpha)g[n]$, where g[n] is the current channel estimate based on a single subframe n, g[n]=W[n]y[n], and $\alpha$ is the filter coefficient.

For multicell channel estimators, CRS interference cancelation may be used to improve the channel estimate of the serving cell. For example, in LTE/-A, when interfering CRS tone positions collide with serving cell CRS tone positions, CRS interference cancelation may be used to cancel out the interfering CRS tones. The cancelation clears the interfering CRS tones, thereby making the serving cell channel estimation more accurate.

Consider a two-cell example, in which the first cell, cell 1, is the serving cell and the second cell, cell 0, is the interfering cell. An assumption is made that the interfering cell 0 is stronger than the serving cell 1. In this configuration, the received signal vector on the CRS tone positions can be expressed as:

$$y[n] = B_0[n]h_0[n] + B_1[n]h_1[n] + n[n] \quad (3)$$
$$\triangleq x_0[n] + x_1[n] + n[n].$$

Due to the presence of the interference, $x_0[n]$, a conventional single cell channel estimation, $\hat{h}_1[n]=W[n]y[n]$, will produce a poor result. To address this result, in the scheme that utilizes CRS interference cancelation, the receiver or UE first estimates the interfering channel gain, $h_0[n]$, with a single cell channel estimator, such as $\hat{h}_0[n]=W_0[n]y[n]$, reconstructs the interference, $\hat{x}_0[n]=B_0[n]\hat{h}_0[n]$, and subtracts it from y[n] to obtain:

$$y[n]-\hat{x}_0[n]=(x_0[n]-\hat{x}_0[n])+x_1[n]+n[n]=B_0[n](h_0[n]-\hat{h}_0[n])+B_1[n]h_1[n]+n[n] \quad (4)$$

Because $h_0[n]$ is stronger than $h_1[n]$, the estimate $\hat{h}_0[n]$ accurate, the residual interference, $x_0[n]-\hat{x}_0[n]$, will be small, and, therefore, $h_1[n]$ may be accurately estimated from $y[n]-\hat{x}_0[n]$ using a single cell channel estimator, such as $\hat{h}_1[n]=W_1[n](y[n]-\hat{x}_0[n])$.

Channel estimation accuracy may further be improved by using iterative interference cancelation to improve the cancelation accuracy and, therefore, to improve the channel estimation quality. In the above two-cell example, if two iterations are used for both cells, the procedure may be written as provided in Table 1.

TABLE 1

| Iteration | Cell | Input | Output |
|---|---|---|---|
| 1 | 0 | y | $y - \hat{x}_0^{(1)}$ |
| 1 | 1 | $y - \hat{x}_0^{(1)}$ | $y - \hat{x}_0^{(1)} - \hat{x}_1^{(1)}$ |
| 2 | 0 | $y - \hat{x}_0^{(1)} - \hat{x}_1^{(1)}$ | $y - \hat{x}_0^{(2)} - \hat{x}_1^{(1)}$ |
| 2 | 1 | $y - \hat{x}_0^{(2)} - \hat{x}_1^{(1)}$ | $y - \hat{x}_0^{(2)} - \hat{x}_1^{(2)}$ | where $\hat{x}_i^{(k)} = B_i \hat{h}_i^{(k)}$ denotes the reconstructed symbol vector for cell i at the end of $k^{th}$ iteration. By defining $\hat{x}_m^{(0)} = 0$, the input and output equations for the iterations may be expressed as provided in Table 2.

TABLE 2

For the $k^{th}$ iteration of the $m^{th}$ cell:

$$\text{Input: } y - \sum_{i=0}^{m-1} \hat{x}_i^{(k)} - \sum_{i=m}^{N-1} \hat{x}_i^{(k-1)}$$

$$\text{Output: } y - \sum_{i=0}^{m} \hat{x}_i^{(k)} - \sum_{i=m+1}^{N-1} \hat{x}_i^{(k-1)}$$

Where $\hat{x}_i^{(0)} = 0$ is the initial value and $\hat{x}_m^{(k)} = B_m \hat{h}_m^{(k)}$, and:

$$\hat{h}_m^{(k)} = W_m^{(k)} \left( y - \sum_{i=0}^{m-1} \hat{x}_i^{(k)} - \sum_{i=m+1}^{N-1} \hat{x}_i^{(k-1)} \right). \tag{5}$$

The iteration process leverages the estimates obtained for each cell signal. Referring to Table 1, the first iteration begins with the interfering cell, Cell 0. This results in an (1) estimate of the interfering signal, $\hat{x}_0^{(1)}$. With this estimation, the first iteration of interference cancelation with the target cell, Cell 1, obtains the estimate of the target cell signal, $\hat{x}_1^{(1)}$. With estimation $\hat{x}_1^{(1)}$, a better estimate of the interfering signal, $\hat{x}_0$, may be obtained. The second iteration then begins with interference cancelation for Cell 0 using the results of the first iteration, resulting in the second, more accurate, estimation of the interfering cell signal, $\hat{x}_0^{(2)}$. Again, with the improved estimate of the interfering cell signal $\hat{x}_0^{(2)}$, a more accurate estimate of the target cell signal $\hat{x}_1^{(2)}$ may also be obtained using the second iteration of interference cancelation on Cell 1. In practical applications, this iteration process may be conducted 2 or 3 times to achieve fairly accurate signal estimates and, therefore, channel estimates.

Just as with the single cell scenario, the multicell channel estimates may be improved by using similar techniques. For example, the observed RS from adjacent subframes, such as subframes n−1, n, and n+1, may be used to estimate h[h]. Additionally, simple filtering over time (e.g. subframe, frames, slots, etc.), e.g. $\hat{h}_m[n] = \alpha \hat{h}_m[n-1] + (1-\alpha) g_m[n]$, where g[n] is the current channel estimate based on a single subframe n.

These reference signal interference cancelation techniques over single cell and multicell channel estimators provide useable interference cancelation results in practical application. However, improvement in the interference cancelation process, whether through better modeling or more efficient algorithms, is a general goal for improving the wireless communication experience. In a theoretical framework, interference cancelation may achieve optimal results through use of a channel estimation algorithm based on Kalman filtering.

Kalman filtering is a mathematical method that generally uses measurements, observed over time, that contain noise (random variations) and other inaccuracies, and recursively produces values that tend to be closer to the true values of the measurements and their associated calculated values. In a Kalman filtering process, the channel fading process is modeled as a $1^{st}$ order Markov process:

$$h_m[n] = \alpha_m h_m[n-1] + e_m[n], e_m[n] \sim N(0, E_m) \tag{6}$$

where n is the time or subframe index, $\alpha_m$ captures the inter-subframe correlation, and $e_m[n]$ is referred to as the innovation process. The innovation process is the component that identifies and relates how the channel changes over time. Using this channel gain model, the received or observed signal is represented by:

$$y[n] = \sum_i B_i[n] h_i[n] + n[n], n \sim N(0, N) \tag{7}$$

which is a noisy observation. Here, y[n] is observed, $B_i[n]$ is known from the system, n[n] is additive noise, and some form of h is known, based on equation (6), and how it evolves over time.

Kalman filtering is a recursive estimator that uses a system's dynamic model, such as equation (6) above, and measurements, such as y[n] of equation (7), to form an estimate of the system's state, such as the channel gain $h_m[n]$, that is generally better than the estimate obtained using any one measurement alone, such as from a single subframe. The Kalman filter works recursively and uses only the last "best guess," not the entire system state history, of a system's state in order to calculate a new state.

The Kalman filtering solution may be decomposed into two distinct phases: the prediction phase and the update phase. Considering the channel fading process and received signals from equations (6) and (7) above, the Kalman filter solution is given as follows: Prediction Phase:

$$\hat{h}_m^0[n] = \alpha_m \hat{h}_m[n-1] \tag{8}$$

which provides the optimal estimate or prediction of the current channel estimate. Update Phase:

$$\hat{h}_m[n] = \hat{h}_m^{(0)}[n] + K_m[n] \left( y[n] - \sum_i B_i[n] \hat{h}_i^{(0)}[n] \right) \tag{9}$$

where $K_m[n]$ is the Kalman gain given by the formula:

$$K_m[n] = \tag{10}$$
$$(\alpha^2 P_m[n-1] + E_m) B_m^H[n] \left( \sum_i B_i[n] (\alpha^2 P_i[n-1] + E_i) B_i^H[n] + N \right)^{-1}$$

where $P_m[n]$ is the estimated covariance given by the formula:

$$P_m[n] = (I - K_m[n] B_m[n])(\alpha^2 P_m[n-1] + E_m) \tag{11}$$

where $E_m$ is the covariance of the innovation process for the channel $h_m[n]$, as shown in equation (6).

The derivation of the Kalman gain, $K_m[n]$, is generally expensive to compute and requires knowledge of $E_m$, which is not typically available in practical wireless communication systems. Therefore, while channel estimation based on Kalman filtering provides a theoretical optimum estimation, it is impractical for use in operating wireless communication systems.

In considering the Kalman filter process, an interesting observation can be made. Referring back to equations (8)-(9), the Kalman update phase, $\hat{h}_m^{(0)}[n]$ may be considered the prediction, the Kalman gain, $K_m[n]$, may be considered the channel estimator, while $(y[n]-\Sigma_i B_i[n]\hat{h}_m^{(0)}[n])$ may be considered the interference cancelation of the signals transmitted in the target cell and non-target cells. This may be compared with the CRS interference cancelation formula of equation (5), which may be re-written as follows:

$$\hat{h}_m^{(k)}[n] = W_m^{(k)}[n]\left(y[n] - \sum_{i=0}^{m-1} B_i[n]\hat{h}_i^{(k)}[n] - \sum_{i=m+1}^{N-1} B_i[n]\hat{h}_i^{(k-1)}[n]\right) \quad (12)$$

where $W_m^{(k)}[n]$ is the channel estimator and $(y[n]-\Sigma_{i=0}^{m-1}B_i[n]\hat{h}_i^{(k)}[n]-\Sigma_{i=m+1}^{N-1}B_i[n]\hat{h}_i^{(k-1)}[n])$ is the interference cancelation of the interfering signals transmitted by the non-target cells. Thus, there is a similarly between the Kalman filtering update phase and the CRS interference cancelation process.

One of the main differences between the Kalman filtering and the CRS interference cancelation process is that, in Kalman filtering, interference cancelation is performed for all cells, including the target cell. Therefore, there is a self-cancelation of the target cell signals leaving only the residual portion of the channel, $\hat{h}_m[n]-\hat{h}_m^{(0)}[n]$, which is the portion of the channel that was not estimated in the previous subframe, to be estimated. The previous subframe estimate, $\hat{h}_m^{(0)}[n]$, is then re-added. In contrast, there is no self-cancelation performed in the CRS interference cancelation. Interference cancelation is performed for the non-target interfering cells. Therefore, in CRS interference cancelation, the target cell channel is estimated completely all over again.

Another difference between the Kalman filtering and the CRS interference cancelation process is that the Kalman filter uses an optimal channel estimator, $K_m[n]$, while CRS interference cancelation may use a suboptimal channel estimator. Moreover, CRS interference cancelation may use multiple iterations, while Kalman filtering generally uses only a single iteration, as multiple iterations of Kalman filtering are generally unnecessary because the Kalman filter is optimal for any given subframe.

In recognizing the similarities and differences between the CRS interference cancelation process and Kalman filtering, modifications may be applied to multicell CRS interference cancelation that improves the performance of the channel estimation. Instead of requiring the interference cancelation procedure to completely restart from zero for each new subframe, the process is initialized using the estimate from the previous subframe, which leads to:

$$\hat{h}_m^{(k)}[n]=W_m^{(k)}[n](y[n]-\Sigma_{i=0}^{m-1}B_i[n]\hat{h}_i^{(k)}[n]-\Sigma_{i=m+1}^{N-1}B_i[n]\hat{h}_i^{(k-1)}[n]) \quad (13)$$

where the initial value, $\hat{h}_m^{(0)}[n]$, which was previously initialized to 0, is now initialized with the Kalman prediction:

$$\hat{h}_i^{(0)}[n]=\alpha_i \hat{h}_i=\alpha_i \hat{h}_i[n-1] \quad (14)$$

For simplified design, $\alpha_i$ may be assumed to equal 1. Thus, the initializing channel estimate, $\hat{h}_i^{(0)}[n]$, is the previous estimate from the previous subframe, $\hat{h}_i[n-1]$. However, in additional aspects, a more accurate inter-subframe correlation value may be calculated. In such aspects, the initializing channel estimate is based on the previous subframe estimate, but is not necessarily the same as the previous estimate.

Figure 5A:
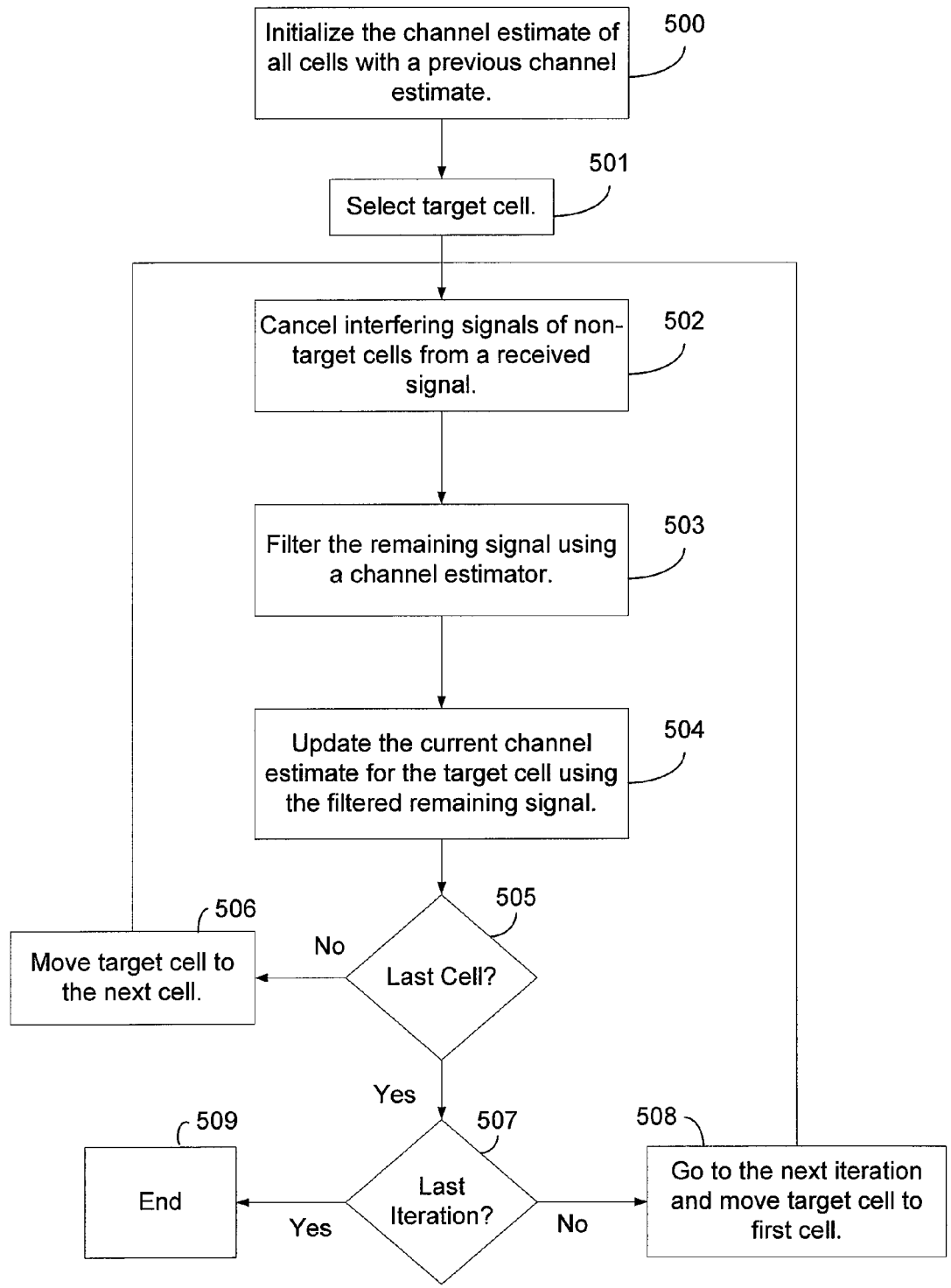
FIG. 5A is a functional block diagram illustrating example blocks executed to implement one aspect of the present disclosure.
Figure 5B:
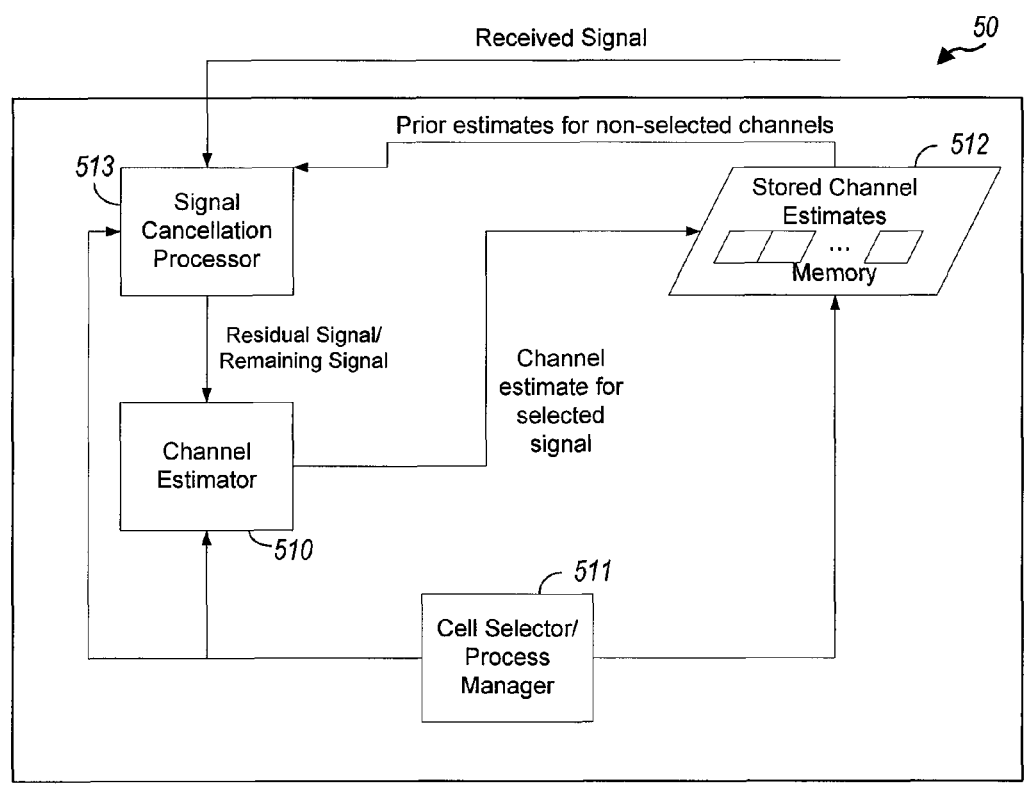
FIG. 5B is a block diagram illustrating a UE configured according to one aspect of the present disclosure.

FIG. 5A is a functional block diagram illustrating example blocks executed to implement one aspect of the present disclosure. FIG. 5B is a block diagram illustrating a UE 50 configured according to one aspect of the present disclosure. In block 500, a current channel estimate for all cells is initialized at a signal cancellation processor 513 with a previous channel estimate stored in stored channel estimates memory 512. A target cell is selected in block 501 by cell selector/process manager 511 of UE 50. Interfering signals of the non-target cells are canceled at the signal cancelation processor 513 from a received signal, in block 502. The signals resulting after the cancelation are referred to as the remaining signal. The remaining signal is filtered, in block 503, using a channel estimator 510. The current channel estimate is updated to the stored channel estimates memory 512 for the target cell, in block 504, using the filtered remaining signal. A determination is made, in block 505, by the cell selector/process manager 511 whether the mobile device has analyzed channel estimate for each cell as a target cell. If not, then the next cell is selected by the cell selector/process manager 511 for the target cell, in block 506, and the process repeats from canceling the interfering signals in block 502. If all cells have been considered as the target cell, then, in block 507, a determination is made by the cell selector/process manager 511 whether all iterations have been performed. If not, then, in block 508, the cell selector/process manager 511 moves to the next iteration and resets the target cell to the first cell. If all iterations have been performed, then, in block 509, the target channel estimate process ends. With such functionality, the channel estimate for the current subframe is estimated based on the estimate from either the previous subframe or the previous iteration.

In additional aspects of the present disclosure, the self-cancelation aspect of the Kalman filter may also be added to the CRS interference cancelation process to improve the resulting channel estimate. In addition to initializing the estimation process with a channel estimate equal to or based on the previous subframe, the interference cancelation cancels all interfering signals from the received signal, including the signal from the target cell. This modified CRS interference cancelation process with self-cancelation may be represented as:

$$\hat{h}_m^{(k)}[n] = \quad (15)$$
$$\hat{h}_m^{(k-1)}[n] + W_m^{(k)}[n]\left(y[n] - \sum_{i=0}^{m-1} B_i[n]\hat{h}_i^{(k)}[n] - \sum_{i=m}^{N-1} B_i[n]\hat{h}_i^{(k-1)}[n]\right)$$

With the self-cancelation aspect of the modified CRS interference cancelation process, only the residual signal remains after canceling all of the interfering signals from the received signal. The resulting channel estimate will then be based on the filtered residual signal and a channel estimate itself based on the channel estimate of either the previous subframe or the previous iteration. The function blocks described in FIG. 5 may be executed by an eNB or UE. For example, the function instructions or blocks may be stored on a memory, such as memory 442 or 482, and my be executed by Controller processor 440 or 480.

Figure 6:
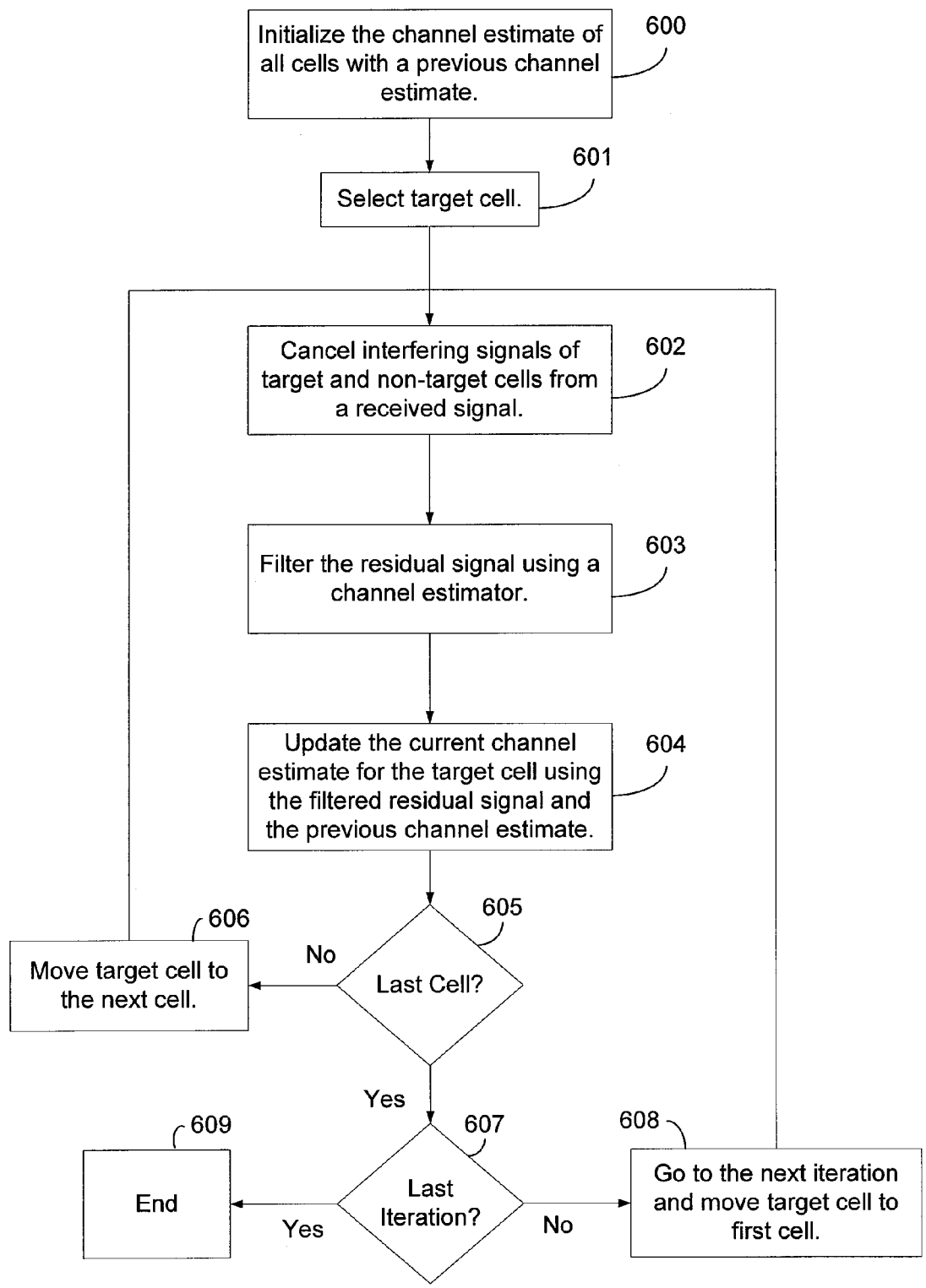
FIG. 6 is a functional block diagram illustrating example blocks executed to implement one aspect of the present disclosure.

FIG. 6 is a functional block diagram illustrating example blocks executed to implement one aspect of the present disclosure. In block 600, the channel estimate for all cells is initialized with a previous channel estimate computed for a previous subframe. A target cell is selected in block 601. In block 602, interfering signals of the target and non-target cells are canceled from a received signal in the current cell, leaving only a residual signal. The residual signal is filtered, in block 603, using a channel estimator. The current channel estimate is then updated for the target cell, in block 604, using the filtered residual signal and the previous channel estimate. In block 605, a determination is made whether all of the cells have been analyzed for the channel estimate. If not, then, the process moves the target cell to the next cell, in block 606, and repeats the analysis from block 602. If all of the cells have been analyzed, then, another determination is made, in block 607, whether all iterations have been performed. If not, then, in block 608, the process is advanced to the next iteration and the target cell is moved to the first analyzed cell, and the analysis begins again at block 602. If all iterations have been performed, then the process ends at block 609. With such functionality in the additional aspect of the disclosure, all interfering signals are canceled from the received signal, including the signal from the target cell. The current channel estimate is then based on the residual signal and either the channel estimate equal to or based on the previous subframe or the previous iteration.

It should be noted that in a single cell application, the process illustrated in FIG. 6 would operate without the loops for the multiple cells and multiple iterations. The same holds true for FIG. 5. Also, for the exemplary process of FIG. 5, the cancellation block 502 may be omitted in certain embodiments, whereby the process degenerates to a single cell channel estimator.

Thus, the exemplary embodiment of FIG. 5 provides blocks for a process according to a first embodiment that involves initializing the channel estimation for all cells with a previous channel estimate and cancellation of reference signals of non-target cells to accurately update channel estimate of the target cell, while the exemplary embodiment of FIG. 6 provides blocks for a process according to an alternative embodiment that involves initializing the channel estimate for all cells with a previous channel estimate and cancelation of reference signals of all cells to accurately estimate residual channel estimate of the target cell and update its channel estimate.

In a wireless network, such as the exemplary wireless network 100 of FIG. 1, a UE 120 may be located in a position having a proximity to multiple eNBs, such as eNBs 110*d*, 110*e*, and 110*f* such that the signal received by the UE 120 not only includes the signal transmission from a target eNB (e.g., eNB 110*f*), but may also include interfering signals transmitted from the other eNBs 110*d* and 110*e*, covering non-target cells. UE 120 is configured according to one aspect of the present disclosure and, thus, when canceling the interfering CRS, will operate according to the functional blocks of either FIG. 5 or 6 above, depending on the configuration of UE 120.

Figure 7:
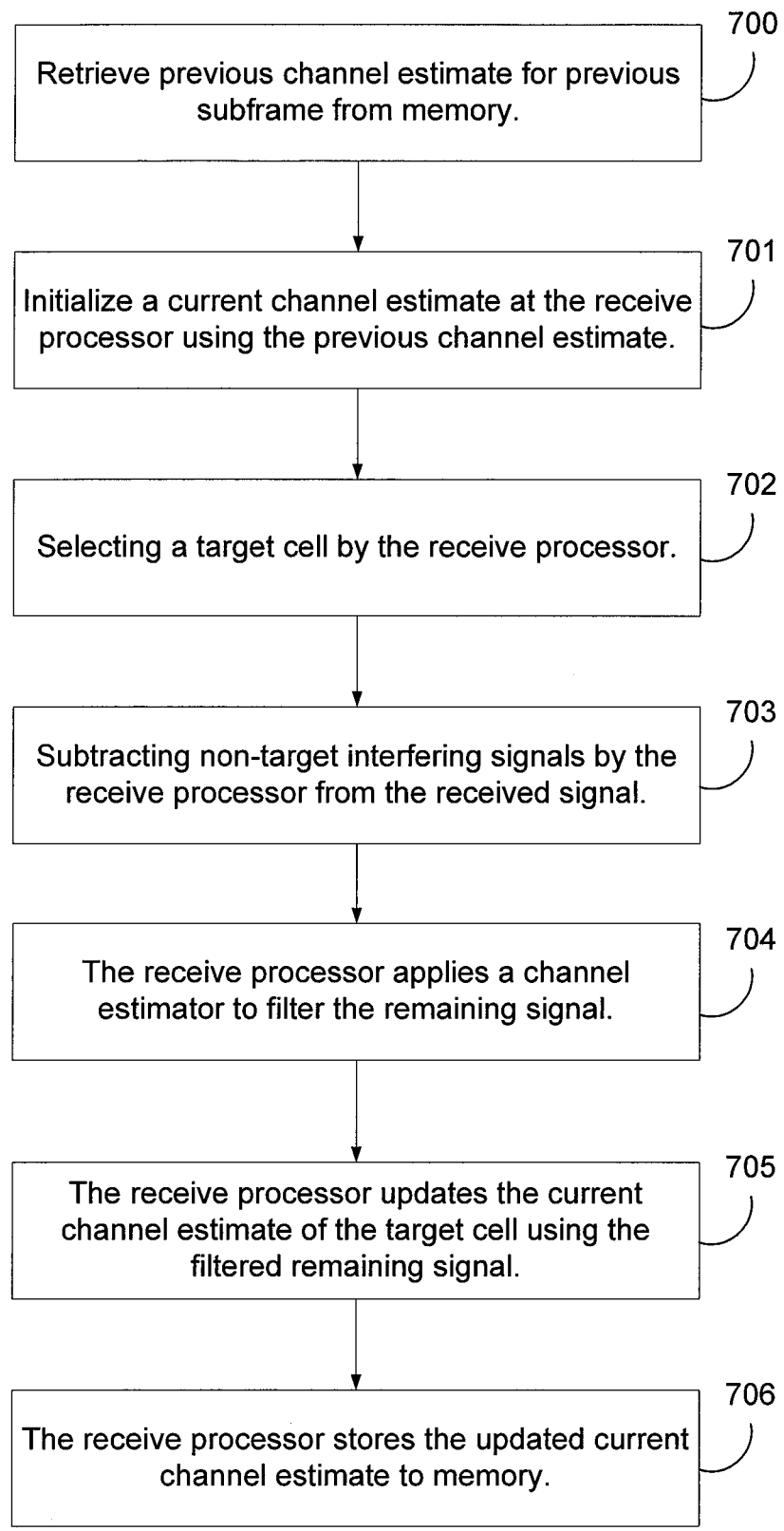
FIG. 7 is a functional block diagram illustrating example blocks executed to implement one aspect of the present disclosure.

FIG. 7 is a functional block diagram illustrating example blocks executed to implement one aspect of the present disclosure. In one configuration of the example aspect, the UE 120 configured for wireless communication includes means for initializing a current channel estimate using a previous channel estimate computed for a previous subframe. The means includes the receive processor 458 retrieving the previous channel estimate for the previous subframe from memory 482 (Block 700). The receive processor 458 then initializes the current channel estimate using the retrieved previous channel estimate (Block 701). The UE also includes means for selecting a target cell from a multiple cells, in which the receive processor designating one of the cells as the target cell for the process (Block 702). The UE also includes means for canceling interfering signals of the non-target cells from a received signal in the target cell. Such means for canceling may include the receive processor 458 subtracting non-target interfering signals from the received signal (Block 703). The UE further includes means for filtering the remaining signal with the receive processor 458 applying a channel estimator to the remaining signal (Block 704). The UE also includes means for updating the current channel estimate using the filtered remaining signal. Such means including the receive processor 458 updating the current channel estimate of the target cell using the filtered remaining signal (Block 705) and then storing the updated channel estimate to memory 482 (Block 706).

Figure 8:
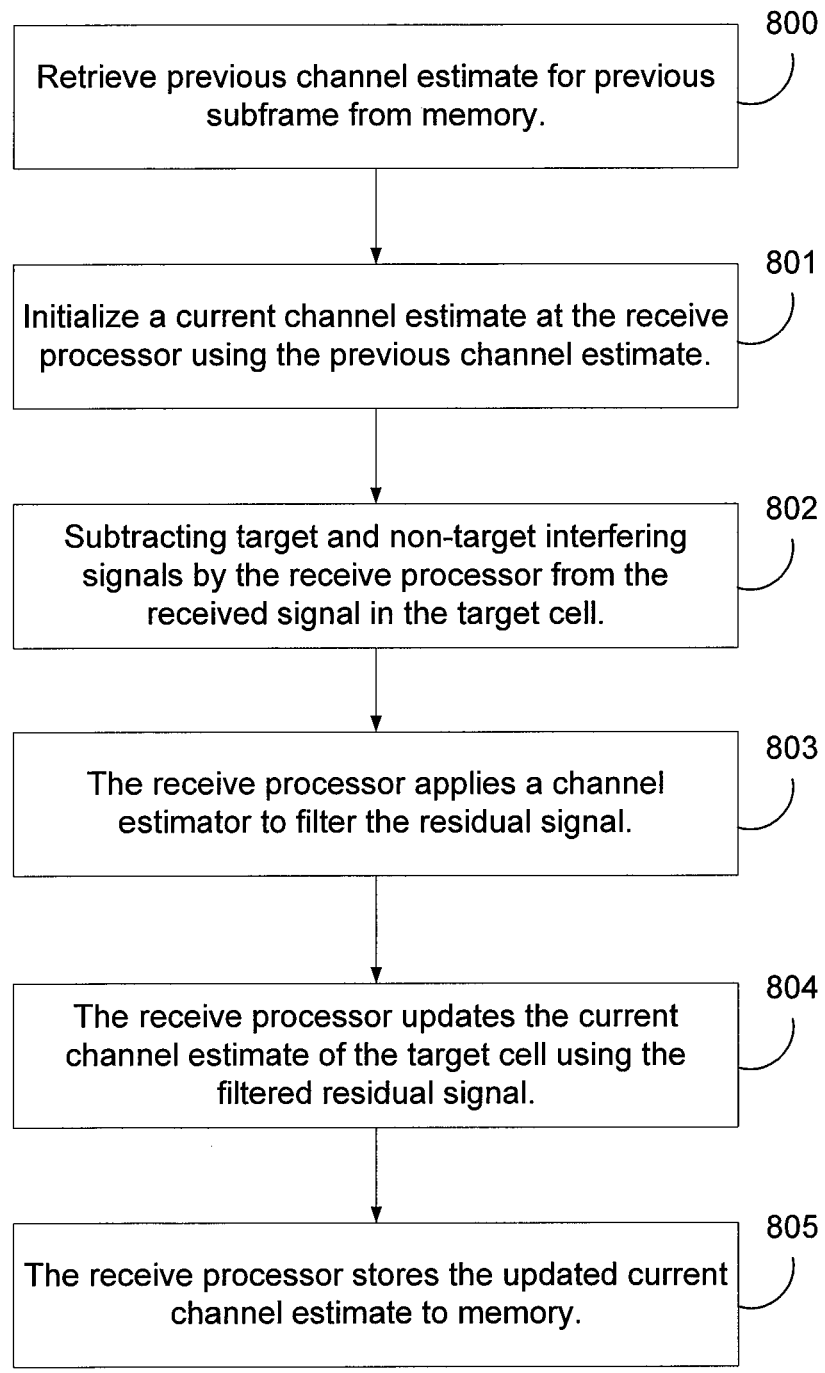
FIG. 8 is a functional block diagram illustrating example blocks executed to implement one aspect of the present disclosure.

FIG. 8 is a functional block diagram illustrating example blocks executed to implement one aspect of the present disclosure. In another configuration, the UE 120 configured for wireless communication includes means for initializing a current channel estimate using a previous channel estimate computed for a previous subframe. Similar to the version of the UE 120 illustrated in FIG. 7, the means includes the receive processor 458 retrieving the previous channel estimate for the previous subframe from memory 482 (Block 800). The receive processor 458 then initializes the current channel estimate using the retrieved previous channel estimate (Block 801). The UE 120 also includes means for canceling interfering signals of a target cell and non-target cells from a received signal. Such means for canceling may include the receive processor 458 subtracting both the target and non-target interfering signals from the received signal (Block 802). The UE 120 also includes means for filtering the residual signal when the receive processor 458 applies a channel estimator to the received signal (Block 803). The UE also includes means for updating the current channel estimate using the filtered residual signal. Such means including the receive processor 458 updating the current channel estimate of the target cell using the filtered residual signal (Block 804) and then storing the updated channel estimate to memory 482 (Block 805).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5, 6, 7, and 8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary non-transitory storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes non-transitory computer storage media. A non-transitory storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   calculating a correlation between a current subframe and a previous subframe;
   modifying a previous channel estimate computed for the previous subframe according to said correlation;
   initializing a current channel estimate using the previous channel estimate;
   selecting a target cell from a plurality of cells;
   canceling interfering signals of non-target cells of said plurality of cells from a received signal in said target cell, said canceling resulting in a remaining signal;
   filtering said remaining signal using a channel estimator; and
   updating said current channel estimate of said target cell using said filtered remaining signal.

2. The method of claim 1 further comprising:
   selecting a next target cell from said plurality of cells;
   performing said canceling, said filtering, and said updating for said next target cell.

3. The method of claim 1 wherein said channel estimator comprises a single cell channel estimator.

4. The method of claim 1 wherein said canceling, said filtering, and said updating are performed over a plurality of iterations.

5. A method of wireless communication, comprising:
   calculating a correlation between a current subframe and a previous subframe:
   modifying a previous channel estimate computed for the previous subframe according to said correlation;
   initializing a current channel estimate using the previous channel estimate;
   canceling interfering signals of a target cell and non-target cells from a received signal, said canceling resulting in a residual signal;
   filtering said residual signal using a channel estimator; and
   updating said current channel estimate of said target cell using said filtered residual signal and said previous channel estimate.

6. The method of claim 5 wherein said canceling is performed on said interfering signals originating from one of:
   said target cell; and
   a plurality of cells.

7. The method of claim 6, said interfering signals originating from said plurality of cells, wherein said canceling, said filtering, and said updating are performed for said target cell and each cell of said plurality of cells.

8. The method of claim 7 wherein said canceling, said filtering, and said updating for said target cell and each cell of said plurality of cells are performed over a plurality of iterations.

9. The method of claim 5 wherein said channel estimator comprises a single cell channel estimator.

10. A user equipment (UE) configured for wireless communication, comprising:
    means for calculating a correlation between a current subframe and a previous subframe;
    means for modifying a previous channel estimate computed for the previous subframe according to said correlation;
    means for initializing a current channel estimate using previous channel estimate;
    means for selecting a target cell from a plurality of cells;

means for canceling interfering signals of non-target cells of said plurality of cells from a received signal in said target cell, said means for canceling resulting in a remaining signal;

means for filtering said remaining signal using a channel estimator; and means for updating said current channel estimate of said target cell using said filtered remaining signal.

11. The UE of claim 10 further comprising:

means for selecting a next target cell from said plurality of cells;

means for performing said means for canceling, said means for filtering, and said means for updating for said next target cell.

12. The UE of claim 10 wherein said channel estimator comprises a single cell channel estimator.

13. The UE of claim 10 wherein said means for canceling, said means for filtering, and said means for updating are performed over a plurality of iterations.

14. A user equipment (UE) configured for wireless communication, comprising:

means for calculating a correlation between a current subframe and a previous subframe;

means for modifying a previous channel estimate computed for the previous subframe according to said correlation;

means for initializing a current channel estimate using the previous channel estimate;

means for canceling interfering signals of a target cell and non-target cells from a received signal, said means for canceling resulting in a residual signal;

means for filtering said residual signal using a channel estimator; and means for updating said current channel estimate of said target cell using said filtered residual signal and said previous channel estimate.

15. The UE of claim 14 wherein said means for canceling is performed on said interfering signals originating from one of:

said target cell; and a plurality of cells.

16. The UE of claim 15, said interfering signals originating from one of said target cell and said plurality of cells, wherein said means for canceling, said means for filtering, and said means for updating are performed for said target cell and each cell of said plurality of cells.

17. The UE of claim 16 wherein said means for canceling, said means for filtering, and said means for updating said target cell and each cell of said plurality of cells are performed over a plurality of iterations.

18. The UE of claim 14 wherein said channel estimator comprises a single cell channel estimator.

19. A computer program product for wireless communications in a wireless network, comprising:

a non-transitory computer-readable medium having program code recorded thereon, said program code comprising:

program code to calculate a correlation between a current subframe and a previous subframe;

program code to modify a previous channel estimate computed for the previous subframe according to said correlation;

program code to initialize a current channel estimate using the previous channel estimate;

program code to select a target cell from a plurality of cells;

program code to cancel interfering signals of non-target cells of said plurality of cells from a received signal in said target cell, execution of said program code to cancel resulting in a remaining signal;

program code to filter said remaining signal using a channel estimator; and program code to update said current channel estimate of said target cell using said filtered remaining signal.

20. The computer program product of claim 19 further comprising:

program code to select a next target cell from said plurality of cells;

program code to execute said program code to cancel, said program code to filter, and said program code to update for said next target cell.

21. The computer program product of claim 19 wherein said channel estimator comprises a single cell channel estimator.

22. The computer program product of claim 19 wherein said program code to cancel, said program code to filter, and said program code to update are performed over a plurality of iterations.

23. A computer program product for wireless communications in a wireless network, comprising:

a non-transitory computer-readable medium having program code recorded thereon, said program code comprising:

program code to calculate a correlation between a current subframe and a previous subframe;

program code to modify a previous channel estimate computed for the previous subframe according to said correlation;

program code to initialize a current channel estimate using the previous channel;

program code to cancel interfering signals of a target cell and non-target cells from a received signal, said program code to cancel resulting in a residual signal;

program code to filter said residual signal using a channel estimator; and program code to update said current channel estimate of said target cell using said filtered residual signal and said previous channel estimate.

24. The computer program product of claim 23 wherein said program code to cancel is performed on said interfering signals originating from one of:

said target cell; and a plurality of cells.

25. The computer program product of claim 24, said interfering signals originating from one of said target cell and said plurality of cells, wherein said program code to cancel, said program code to filter, and said program code to update are performed for said target cell and each cell of said plurality of cells.

26. The computer program product of claim 25 wherein said program code to cancel, said program code to filter, and said program code to update for said target cell and each cell of said plurality of cells are performed over a plurality of iterations.

27. The computer program product of claim 23 wherein said channel estimator comprises a single cell channel estimator.

28. A user equipment (UE) configured for wireless communication, said UE comprising:

at least one processor; and a memory coupled to said at least one processor, wherein said at least one processor is configured to:
  calculate a correlation between a current subframe and a previous subframe;
  modify a previous channel estimate computed for the previous subframe according to said correlation;
  initialize a current channel estimate using the previous channel estimate;
  select a target cell from a plurality of cells;
  cancel interfering signals of non-target cells of said plurality of cells from a received signal in said target cell, said cancelation resulting in a remaining signal;
  filter said remaining signal using a channel estimator; and
  update said current channel estimate of said target cell using said filtered remaining signal.

29. The UE of claim 28 said at least one processor further configured to:
  select a next target cell from said plurality of cells;
  perform said cancelation, said filtering, and said update for said next target cell.

30. The UE of claim 28 wherein said channel estimator comprises a single cell channel estimator.

31. The UE of claim 28 wherein said configuration of said at least one processor to cancel, to filter, and s to update are performed over a plurality of iterations.

32. A user equipment (UE) configured for wireless communication, said UE comprising:
  at least one processor; and
  a memory coupled to said at least one processor,
  wherein said at least one processor is configured to:
    calculate a correlation between a current subframe and a previous subframe;
    modify a previous channel estimate computed for the previous subframe according to said correlation;
    initialize a current channel estimate using the previous channel estimate;
    cancel interfering signals of a target cell and non-target cells from a received signal, said cancelation resulting in a residual signal;
    filter said residual signal using a channel estimator; and
    update said current channel estimate of said target cell using said filtered residual signal and said previous channel estimate.

33. The UE of claim 32 wherein said configuration of said at least one processor to cancel is performed on said interfering signals originating from one of:
  said target cell; and
  a plurality of cells.

34. The UE of claim 33, said interfering signals originating from said target cell and said plurality of cells, wherein said configuration of said at least one processor to cancel, to filter, and to update are performed for said target cell and each cell of said plurality of cells.

35. The UE of claim 34 wherein said configuration of said at least one processor to cancel, to filter, and to update for said target cell and each cell of said plurality of cells are performed over a plurality of iterations.

36. The UE of claim 32 wherein said channel estimator comprises a single cell channel estimator.

* * * * *